H. TATJE.
DOOR HANGER.
APPLICATION FILED JULY 24, 1913.

1,083,955.

Patented Jan. 13, 1914.

Witnesses:

Inventor
Hermann Tatje,
By his Attorney

UNITED STATES PATENT OFFICE.

HERMANN TATJE, OF NEW YORK, N. Y.

DOOR-HANGER.

1,083,955.  Specification of Letters Patent.  Patented Jan. 13, 1914.

Application filed July 24, 1913.  Serial No. 780,904.

*To all whom it may concern:*

Be it known that I, HERMANN TATJE, a citizen of the United States, and a resident of the city of New York, borough of Brooklyn, county of Kings, and State of New York, have invented certain new and useful Improvements in Door-Hangers, of which the following is a specification.

My invention relates to hangers for sliding doors, and the like; and its object is to provide a door-hanger with a roller or means for enabling the same to be moved upon its way or support with a minimum of friction, to simplify the device and reduce the cost of its construction, and to so organize it that it may be assembled and taken apart with the least amount of difficulty and loss of time.

The invention consists in the novel construction and combination of parts hereinafter described and further pointed out in the claims.

Figure 1:
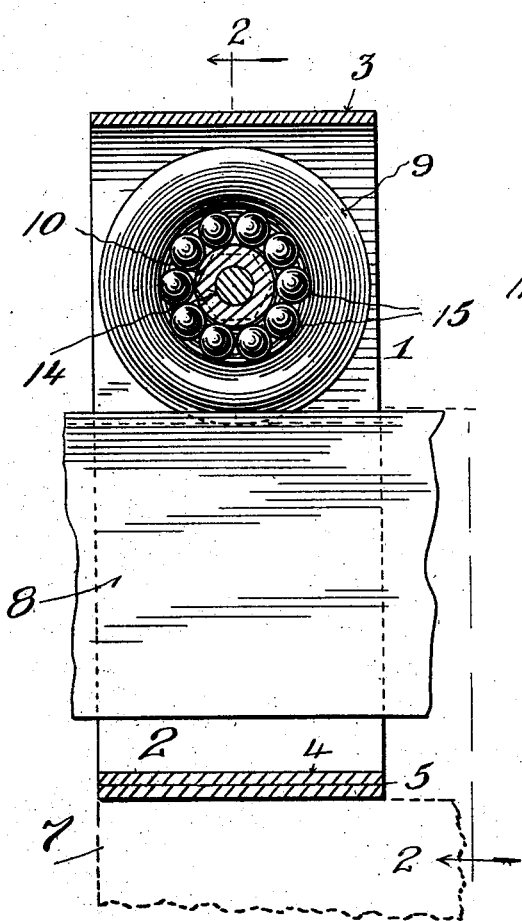
Figure 2:
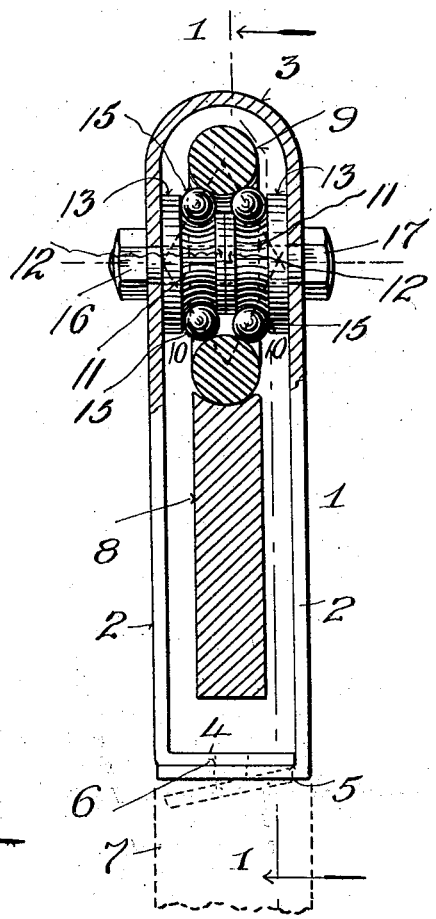

In the drawing, forming part of this specification: Figure 1 is a sectional elevation of the hanger and supporting rail on the line 1—1 of Fig. 2, looking in the direction of the arrows; and Fig. 2 is an end elevation, partly in section, the section being taken on the line 2—2 of Fig. 1, looking in the direction of the arrows.

Similar reference characters indicate corresponding parts throughout the several views.

In the drawing the hanger 1 is shown as being constructed out of a single strip of flat metal comprising the side pieces 2, top cross-piece 3 preferably curved at the top, and lower inturned ends 4, 5, one end lying over the other and provided with holes 6 for the passage of screws. This method of forming the hanger-frame increases its strength at this point and gives it a long bearing for the purpose of enabling it to be very rigidly secured to a door 7. The method of bending one end of the frame over the other is shown in dotted lines. As both flanges are provided with holes, a screw can be passed therethrough for the purpose of readily securing the hanger to the door 7.

At 8 is shown the run-way or rail grooved at the top to receive the circular tread of the supporting wheel 9. This wheel or roller is mounted on separate sets or runs of balls, so that the supporting wheel or roller will have a double bearing on the anti-friction balls one being at each side of the vertical center of the wheel; and the anti-friction balls are so supported that they will have a bearing in their respective races which is wider than the width of their bearing against the wheel, the anti-friction balls being retained in independent races or bearings and rigidly confined in place against inadvertent lateral movement. Thus the supporting wheel is confined in place, its alinement with the supporting rail maintained and lateral displacement relative to the balls and their races or bearings prevented. To secure these results, as well as to accomplish the other objects of my invention, I provide separate and independent race-ways or bearings 10, each provided with a circumferential groove 11, an inner annular flange 12 and an outer and enlarged annular flange 13. Each of these race ways or bearings are provided with holes for the passage of a bolt 14, upon which they are loosely mounted. Each of the race-ways or bearings carries a series of anti-friction balls 15. As shown, these balls bear against the outer flanges 13, as well as on the grooves 11, and also against the inner circumference of the supporting wheel, the outer flange preventing outward displacement of the balls and confining them in their above stated position relative to the supporting wheel. By reference to the dotted lines, it will be noted that the centers of the balls and the supporting wheel form a pyramid with its base in the longitudinal axis.

In assembling the parts, the balls are placed upon the races or bearings with the inner flanges 12 of the latter abutting and the holes through the bearings alining, the outer flanges 13 then facing the side-pieces 2 of the hanger. The bolt may then be passed through the side pieces of the hanger and the bearings, and by tightening up the nut 16 on the end of the bolt against its head 17, all the parts may be brought together and held firmly in place, the nut and head bearing against the side pieces 2. The bearings may be left just free enough to rotate on the bolt, their lateral displacement being prevented by the side pieces of the hanger. The device, as thus constructed, lends itself to being very readily assembled and taken apart.

I do not limit myself to the exact details of construction, but consider that my invention is as broad as the scope of the claims appended hereto.

Having described my invention, I claim:

1. In a door hanger, a hanger frame, a bolt mounted therein, independent race-ways loosely mounted on said bolt within said frame, said race-ways being provided with circumferential grooves and inner and outer flanges, anti-friction balls in said race-ways and a supporting wheel surrounding said race-ways and having bearing upon said balls.

2. In a door hanger, a hanger frame, comprising upright side pieces connected at the top and overlapped inturned ends at the lower ends of the hanger frame and means for securing the hanger frame to the door, a bolt held in the side pieces of said frame near the bend, race-ways loosely mounted on said bolt between the side pieces, each race-way having a circumferential groove, an inner annular flange and an outer enlarged annular flange, a series of anti-friction balls in said grooves, and a supporting wheel embracing said race-ways and balls, with the balls bearing against the outer flanges and the inner circumference of said wheel, said balls being disposed in said grooves.

3. In a door hanger, a hanger frame of a single strip of metal, with upright side pieces, a curved or bent portion connecting the side pieces, a bolt mounted in the hanger frame toward its upper end, the head and nut of said bolt bearing against the side pieces of the hanger frame, race-ways mounted on said bolt, each raceway having a circumferential groove with inner and outer annular flanges, said outer flanges bearing against the inner sides of the hanger frame, anti-friction balls in said grooves with a circular wheel embracing the race-ways and balls.

4. In a door hanger, a hanger frame formed from a single metal strip, with upright side pieces, said side pieces meeting in a rounded or curved portion at the top, the lower portions of the side pieces being bent horizontally and overlapping and means for securing the hanger to the door.

Signed at the city of New York, borough of Brooklyn, county of Kings and State of New York, this 14 day of July, 1913.

HERMANN TATJE.

Witnesses:
JOHN H. TIEDEMANN,
CHARLES BROOKS.